United States Patent Office 2,733,145
Patented Jan. 31, 1956

---

2,733,145

CORN COB ABSORBENT AND METHOD OF PRODUCING THE SAME

William V. Karr and Michael B. Karr, Columbus, Ohio

No Drawing. Application January 15, 1953,
Serial No. 331,502

7 Claims. (Cl. 99—6)

This invention relates generally to food products, and more particularly to an improved animal feed and method of producing the same.

The present invention is based on the discovery that certain constituents of ground corn cobs provide an excellent absorbent and nutritive carrier for various nutritional products and compositions in the form of carbohydrates, proteins, and vitamin concentrates such as are contained in molasses, fish solubles, milk products, distillery and brewery by-products, and the like, and the fact that such corn cob constituents combined with other nutritional materials provide a superior concentrated feed for livestock.

Heretofore, it has been proposed to prepare livestock feed from a mixture of ground whole corn cobs and molasses wherein the cobs are ground in their entirety in a hammer mill, or the like, and thereafter admixed with approximately 20% to 40% by weight of molasses. Such a composition, however, has been found to be objectionable as a livestock feed primarily because of the relatively large percentage of the more or less nonabsorbent and fibrous woody ring constituent of the cobs and the failure of such woody ring constituent to contribute anything toward the absorptive properties of the carriers or the nutritional qualities of the feed itself. In short, the woody ring constituent of a corn cob comprises approximately 60% by weight of the cob and is composed primarily of cellulosic material practically devoid of any valuable nutritional properties, and is only slightly absorbent in comparison with the remaining constituents of the cob, namely, the outer glume, beeswing, and pith.

It is, therefore, a primary object of the present invention to provide an improved method for producing livestock feed comprising only the valuable constituents of corn cobs admixed with other nutritional food products, and wherein the whole cob, following husking and removal of kernels, is reduced or ground in a hammer mill, or other equivalent reduction apparatus, and thereafter separated or classified to remove the woody ring constituent of the ground cob, leaving a lightweight meal or bran composed of the pith, the outer glume and beeswing which is then dried to a low moisture content and further ground into the form of a fine meal and mixed with 50% to 75% by weight of molasses, or other nutritional food material or materials, and, thereafter subjected to further drying, in order to form a highly concentrated and nutritionally valuable feed for admixture with other and more bulky feeds, such as hay or the like.

Structurally, a corn cob is composed of four constituent parts, namely: (1) the outer glume, (2) the beeswing, (3) the woody ring, and (4) the pith. In comparison, the outer glume, beeswing and pith portions of the cob are much lighter in weight and much more absorbent than is the woody ring portion of the cob. A typical quantitative analysis is as follows:

*Weight and proportions of cob fractions (air-dry basis, approximately 12 per cent. moisture)*

| Item | Weight, Grams | Proportion of cob, Percent |
|---|---|---|
| Cob, whole | 46.3 | 100.0 |
| Cob, fractions: | | |
| Woody ring | 27.9 | 60.3 |
| Outer glume and beeswing | 17.5 | 37.8 |
| Pith | .9 | 1.9 |

In accordance with the present invention, whole corn cobs are crushed, for example, in a reduction device such as a conventional hammer mill so that the ground cobs possess particle sizes enabling the woody ring fraction thereof to be readily separated from the beeswing, outer glume and pith. These constituents, in order to free the same of the woody ring fraction, are subjected to classifier, through which forced air is blown, whereby to remove the lighter weight outer glume, beeswing and pith from remaining heavier woody ring constituent. After such screening or separation, the outer glume, beeswing and pith constituents are preferably reground, as by passage through an attrition mill, hammer mill, or any other suitable type of grinder. Following such reduction, the products are screened to various mesh sizes, as, for example, from ⅜ inch to U. S. size 200 mesh. This reduced lightweight product, in the production of one animal food product, is then mixed with from 50% to 75% by weight of liquid molasses, after which the mixture is placed in a tubular steam drier or the like, and heated to drive off moisture until a substantially dry product (12%–20% moisture) is obtained. In this manner, the powdered concentrate does not cake and remains palatable for use in various animal and other feeds.

It will be understood that various other foods or nutritional agents may be added to these finely ground lightweight absorptive particles in addition to molasses. Such other agents may comprise vitamin concentrates, fish solubles, milk, milk products, meat scraps, normally waste products of fermentation and distillation processes, and the like. These products may be added in either dry, semi-solid or wet form, and after admixture with the outer glume, beeswing and pith constituents of the cobs, the mass is dehydrated as above described to provide the final concentrated form of feed.

In view of the foregoing, it will be seen that our invention provides an improved, nutritional concentrated food product and absorbent carrier for various beneficial food compositions high in mineral and vitamin content. The dried outer glume, beeswing and pith constituents of the corn cob which comprise our improved carrier is itself relatively high in food value and as such adds to the nutritive properties of the particular food concentrate or concentrates admixed and carried therewith.

In addition, the present invention provides an efficient method of producing a concentrated, low-bulk livestock feed which may be conveniently handled, shipped and stored in an economical manner.

We claim:

1. A livestock feed comprising the outer glume, beeswing and pith constituents only of a corn cob, ground and dried and admixed with a nutritional food product.

2. A dried livestock feed comprising a dehydrated mixture of the outer glume, beeswing and pith components only of a corn cob and a nutritive food substance.

3. The method of producing a concentrated livestock feed which comprises mechanically reducing a batch of corn cobs to a relatively finely divided state; separating the lighter weight outer glume, beeswing and pith components of the ground corn cobs from the heavier woody ring component thereof, mixing only said outer glume, beeswing and pith components with a nutritive food substance; and thereafter drying the mixture to a moisture content of approximately 20%.

4. A livestock feed comprising the outer glume, beeswing and pith components only of a ground corn cob, and molasses.

5. A livestock feed comprising the outer glume, beeswing and pith constituents only of a ground corn cob admixed with a nutritive food substance selected from a class consisting of molasses, vitamin concentrates, fish solubles, milk, milk products, meat scraps, and normally waste products of fermentation and distillation processes.

6. The method of producing a concentrated livestock feed, which comprises: mechanically reducing whole corn cobs to a relatively finely divided form, the cobs consisting of a relatively heavy woody ring fraction in a major percentage by weight and outer glume, beeswing and pith comprising light fractions in minor percentages; separating the woody ring fraction from the remaining light fractions; drying and further reducing the separated light fractions to form an absorptive nutritive meal substantially completely free from woody ring constituents; admixing with said meal and in absorptive relation therewith a nutrition-improving food supplement; and thereafter subjecting the resultant meal with the food supplement contained therein to further drying to form a concentrate for admixture with other more bulky animal feeds.

7. The method of claim 6, and wherein the food supplement comprises molasses, the latter being present in quantities at least equal in weight to those of cob constituents with which the supplement is admixed.

References Cited in the file of this patent

UNITED STATES PATENTS

| | | |
|---|---|---|
| 1,598,328 | Truax | Aug. 31, 1926 |
| 2,160,914 | Schmidt | June 6, 1939 |

FOREIGN PATENTS

| | | |
|---|---|---|
| 4,505 | Great Britain | 1875 |